United States Patent
Zhao et al.

(10) Patent No.: US 10,205,246 B2
(45) Date of Patent: Feb. 12, 2019

(54) METAL SHELL OF COMMUNICATION EQUIPMENT

(71) Applicant: BYD COMPANY LIMITED, Shenzhen, Guangdong (CN)

(72) Inventors: Guiwang Zhao, Shenzhen (CN); Konglin Li, Shenzhen (CN); Chencen Liu, Shenzhen (CN); Tao Wu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 15/631,962

(22) Filed: Jun. 23, 2017

(65) Prior Publication Data

US 2017/0288721 A1 Oct. 5, 2017

Related U.S. Application Data

(63) Continuation of application No. PCT/CN2015/098294, filed on Dec. 22, 2015.

(30) Foreign Application Priority Data

Dec. 26, 2014 (CN) .......................... 2014 1 0829098
Dec. 26, 2014 (CN) .......................... 2014 1 0836203

(51) Int. Cl.
*H01Q 13/18* (2006.01)
*H01Q 13/02* (2006.01)
(Continued)

(52) U.S. Cl.
CPC .............. *H01Q 13/02* (2013.01); *C23F 1/36* (2013.01); *H01Q 1/243* (2013.01); *H01Q 1/38* (2013.01);
(Continued)

(58) Field of Classification Search
CPC ................................. H01Q 13/00; H01Q 13/18
(Continued)

(56) References Cited

U.S. PATENT DOCUMENTS 8,896,487 B2* 11/2014 Chiang ................. G06F 1/1616
343/700 MS
2014/0163338 A1* 6/2014 Roesicke ............. A61B 5/0031
600/309
2017/0297242 A1* 10/2017 Li .......................... B29C 45/76

FOREIGN PATENT DOCUMENTS

CN 101958456 A 1/2011
CN 102736686 A 10/2012

OTHER PUBLICATIONS

International Search Report and Written Opinion for Application No. PCT/CN2015/098294, dated Mar. 16, 2016, 10 pages.

* cited by examiner

*Primary Examiner* — John J Lee
(74) *Attorney, Agent, or Firm* — Sheppard Mullin Richter & Hampton LLP

(57) ABSTRACT

The present disclosure provides a metal shell of communication equipment. The metal shell of communication equipment includes a metal substrate, a slit penetrating an inner and an outer surface of the metal substrate, a plastic-supporting layer formed on the inner surface of the metal substrate and a decorative layer formed on the outer surface of the metal substrate, wherein a width of the slit on the outer surface of the metal substrate is 15-500 µm, a width of the slit on the inner surface of the metal substrate is 20-600 µm, and a ratio of the width of the slit on the inner surface of the metal substrate to the width of the slit on the outer surface of the metal substrate is between 1.05:1 and 1.5:1.

20 Claims, 1 Drawing Sheet

(51) Int. Cl.
*C23F 1/36* (2006.01)
*H01Q 1/24* (2006.01)
*H01Q 1/38* (2006.01)
*H04M 1/02* (2006.01)
*H01Q 1/44* (2006.01)
*H01Q 13/10* (2006.01)
*H01Q 1/22* (2006.01)

(52) U.S. Cl.
CPC ............... *H01Q 1/44* (2013.01); *H01Q 13/10* (2013.01); *H01Q 13/18* (2013.01); *H04M 1/026* (2013.01); *H04M 1/0274* (2013.01); *H01Q 1/2266* (2013.01)

(58) Field of Classification Search
USPC .................. 455/550.1, 575.1, 575.5, 90.3
See application file for complete search history.

METAL SHELL OF COMMUNICATION EQUIPMENT

CROSS-REFERENCE TO RELATED APPLICATIONS

This application is a continuation application of International Application No. PCT/CN2015/098294, filed on Dec. 22, 2015, which is based on and claims priority to and benefits of Chinese Patent Applications No. 201410829098.1 and 201410836203.4, both filed with the State Intellectual Property Office (SIPO) of the People's Republic of China on Dec. 26, 2014. The entire contents of the above-identified applications are incorporated herein by reference.

FIELD

Examples of the present disclosure generally relate to a material field, and more particularly to a metal shell of communication equipment.

BACKGROUND

A metal shell may have a better appearance and better texture, in addition, the metal shell may have a better wear resistance and a better scratch resistance. With a development of metal processing technology, mobile phones, tablet PCs and other mobile communication equipment, tend to use metal shell more and more. However, electromagnetic waves could not penetrate the metal shell, especially a metal shell with a large area. In order to achieve a good electrical signal effect, when a metal shell is used, one or more slits need to be processed on the metal shell, and an antenna needs to be designed in the slits.

Current method of processing the slits is mainly by using green light and other shorter wavelength laser to peel a metal substrate layer by layer. A processing efficiency of the current method is low, and due to a problem of depth of focus, a thick metal substrate could not be processed (a thickness of the metal substrate at most could reach 0.4 mm), a product obtained by such processing has low strength. In addition, the processing needs to be repeated several times to cut the metal substrate. A high-velocity scanning of galvanometer which controls a laser path has a certain accuracy, and repeated processing can reduce the processing-accuracy and extend the processing-time. Also the slits processed by this method have a large taper, that is, an outer surface (i.e., an upper surface) is larger than an inner surface (i.e., a lower surface).

SUMMARY

The present disclosure seeks to solve at least one of the technical problems in the related art. Therefore, an objective of the present invention is to provide a metal shell of communication equipment which has a slit with a smaller taper, has an advantage that an electromagnetic signal can pass through a metal shell and has an effect of an integrated appearance.

In order to achieve objectives stated above, the present invention provides a metal shell of communication equipment, the metal shell of communication equipment includes a metal substrate, a slit penetrating inner and outer surfaces of the metal substrate, a plastic-supporting layer formed on an inner surface of a metal substrate and a decorative layer formed on an outer surface of the metal substrate, wherein a width of the slit on the outer surface of the metal substrate is 15-500 µm, the width of the slit on the inner surface of the metal substrate is 20-600 µm, a ratio of the width of the slit on the inner surface of the metal substrate to the width of the slit on the outer surface of the metal substrate is between 1.05:1 and 1.5:1.

In other words, the metal shell of communication equipment includes a metal substrate, a plurality of slits penetrating inner and outer surfaces of the metal substrate, a plastic-supporting layer formed on the inner surface of the metal substrate and a decorative layer formed on an outer surface of the metal substrate, wherein a width of the slit on the outer surface of the metal substrate is 15-500 µm, the width of the slit on the inner surface of the metal substrate is 20-600 µm, a ratio of the width of the slit on the inner surface of the metal substrate to the width of the slit on the outer surface of the metal substrate is between 1.05:1 and 1.5:1.

The metal shell of communication equipment according to the present disclose, an upper surface and a lower surface of the slit are basically without a taper, seam widths of the upper surface and the lower surface do not affect an adoption of the electromagnetic waves, thus, a communication could be easy. In addition, with a covering of a decorative layer, the slits of the shell are not visible to naked eyes, so that, the metal shell has an effect of an integrated appearance, and the appearance of the shell could be rendered as a full metallic texture.

These and other aspects and advantages of examples of the present disclosure will be described in detail with references to the following detailed description.

REFERENCE NUMBER

100: metal substrate
200: slit
300: plastic-supporting layer
400: decorative layer

DETAILED DESCRIPTION

Reference will be made in detail to examples of the present disclosure. The examples described herein are explanatory and illustrative, which are used to generally understand the present disclosure. The examples shall not be construed to limit the present disclosure.

In some embodiments of the present disclosure, communication equipment could be mobile phones, tablets, laptops, bluetooth headsets and other equipment.

In some embodiments of the present disclosure, the inner surface of the metal shell is defined as, when the metal shell is assembled into communication equipment, a surface of the metal shell that faces toward inside of the communication equipment. It should be noted that the outer surface of the metal shell is defined as, when the metal shell is assembled into communication equipment, a surface of the metal shell that faces toward outside of the communication equipment. Besides, the inner and outer surfaces of the metal substrate used for manufacturing the metal shell and the inner and outer surfaces of the silt could also be applied to the definition above.

In some embodiments of the present disclosure, a term "laser cutting" means that a workpiece, that is a metal substrate, is irradiated with a focused and high-power-density laser beam, so that irradiated material is rapidly melted, vaporized, ablated or reaches the ignition point, molten material would be blown away via high-speed airflow which is coaxial with the laser beam, thus the workpiece could be cut off In some embodiments of the present disclosure, the material of the metal substrate could be any metal that commonly used in communication equipment in the art, for example, aluminum alloy, stainless steel, magnesium alloy or titanium alloy.

Figure 1:
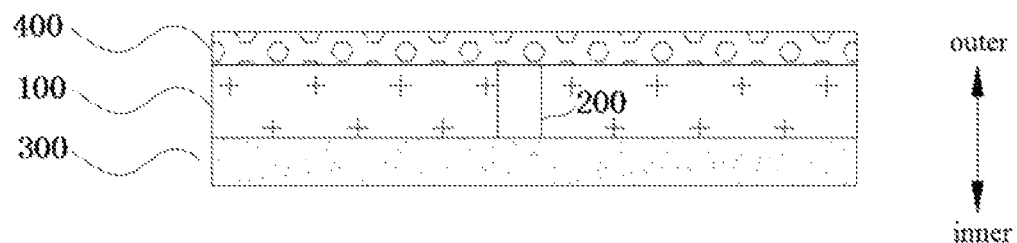
FIG. 1 is a schematic view of a metal shell of communication equipment according to one embodiment of the present disclosure.

In an aspect of the present disclosure, the present disclosure provides a metal shell of communication equipment. An embodiment according to the present disclosure, referring to FIG. 1, the metal shell of communication equipment includes a metal substrate 100, a slit 200, a plastic-supporting layer 300 and a decorative layer 400. The slit 200 penetrates inner and outer surfaces of the metal substrate 100. A width of the slit 200 on the outer surface of the metal substrate 100 is 15-500 µm, a width of the slit 200 on the inner surface of the metal substrate 100 is 20-600 µm, and a ratio of the width of the slit 200 on the inner surface of the metal substrate 100 to the width of the slit 200 on the outer surface of the metal substrate 100 is between 1.05:1 and 1.5:1. The plastic-supporting layer 300 is formed on the inner surface of the metal substrate 100, and the decorative layer 400 is formed on the outer surface of the metal substrate 100. In some embodiments of the present disclosure, the slit 200 is configured to ensure a signal transmission between an antenna and the outside world, thus, a communication could be achieved. Therefore, an inner surface and an outer surface of the slit are basically without a taper, seam widths of the inner surface and the outer surface do not affect an adoption of electromagnetic waves, and the communication is easy. With a covering of the decorative layer, the slits of the shell are not visible to naked eyes viewing from the outer surface, an aesthetic aspect of the metal shell is improved, and additional protection for the outer surface of the metal substrate 100 is provided.

According to embodiments of the present disclosure, there is no particular limitation for the thickness of the metal substrate, it could be regulated by one with ordinary skills in the art according to a specific communication equipment. For example, the metal substrate may have a thickness of 0.2 millimeters to 2 millimeters, in some embodiments of the present disclosure, the metal substrate may have a thickness of 0.6 millimeters to 1.2 millimeters.

To realize communication more effectively, in some embodiments of the present disclosure, the width of the slit on the outer surface of the metal substrate is 15-500 µm, the width of the slit on the inner surface of the metal substrate is 20-250 µm, and the ratio of the width of the slit on the inner surface of the metal substrate to the width of the slit on the outer surface of the metal substrate is between 1.05:1 and 1.4:1. In some embodiments of the present disclosure, the width of the slit on the outer surface of the metal substrate is 15-200 µm, the width of the slit on the inner surface of the metal substrate is 20-220 µm, and the ratio of the width of the slit on the inner surface of the metal substrate to the width of the slit on the outer surface of the metal substrate is between 1.1:1 and 1.35:1. In addition, the slit 200 may have a length of 0.1-500 mm, in some embodiments of the present disclosure, the slit 200 may have a length of 10-150 mm.

According to embodiments of the present disclosure, the ratio of the width of the slit on the inner surface of the metal substrate to the width of the slit on the outer surface of the metal substrate is within the above range, thus, the inner surface and the outer surface of the slit are basically without a taper, the slit could be more conductive to the transmission of the signal, and the communication could be easy.

Figure 2:
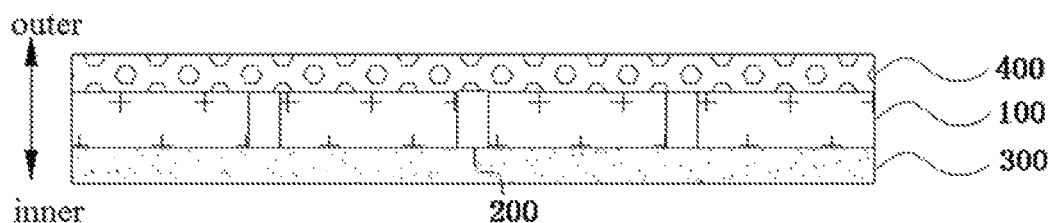
FIG. 2 is a schematic view of a metal shell of communication equipment according to another embodiment of the present disclosure.
Figure 3:
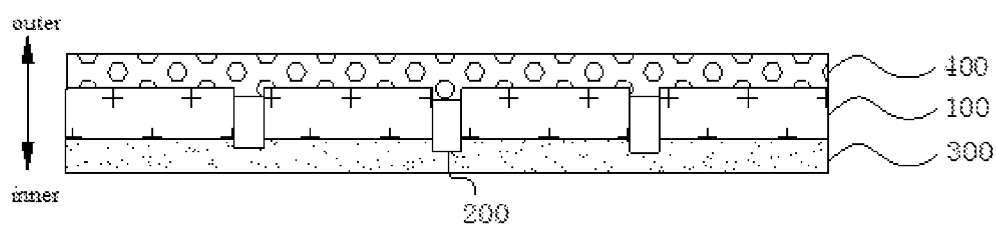
FIG. 3 is a schematic view of a metal shell of communication equipment according to one another embodiment of the present disclosure.

Moreover, in order to be more effectively transmitting the signal through the metal shell, referring to FIG. 2, a plurality of slits are disposed in the metal substrate. That is, in the metal substrate, more than one slits penetrating inner and outer surfaces of the metal substrate are formed. A distance between two adjacent slits is 0.1-10 mm. In other embodiments of the present disclosure, the distance between two adjacent slits is 0.3-1.6 mm. Besides, there are no particular limitations for the number and shape of the slit, as long as the slit could realize communication. For example, the number of the slits may be 1 to 200. In some embodiments of the present disclosure, the number of the slits may be 5 to 50, and the slit may have a shape of linear, curvilinear, square wave linear or sawtooth linear, in some embodiments of the present disclosure, the slit has a shape of linear.

In some embodiments of the present disclosure, there are no particular limitations for position, shape and thickness of the plastic-supporting layer, and those skilled in the art could make selections according to the actual situation. For example, the plastic-supporting layer could be disposed at a position corresponding to the slit in the inner surface of the metal substrate, that is, the plastic-supporting layer is disposed to cover the slit. Besides, the plastic-supporting layer could be disposed to cover the whole inner surface of the metal substrate. In some embodiments of the present disclosure, the thickness of the plastic-supporting layer may be a conventional thickness in the art, for example, the plastic-supporting layer has a thickness of 0.1-2 mm. In some embodiments of the present disclosure, the plastic-supporting layer has a thickness of 0.4-1.1 mm.

In some embodiments of the present disclosure, a material of the plastic-supporting layer could be resin, the resin could be polyethylene, polypropylene, polyacetal, polystyrene, modified polyphenyl ether, polyethylene glycol terephthalate, polybutylene terephthalate, polyethylene naphthalate, polyphenylene sulfide, polyimide, polyamide-imide, polyetherimidem, polysulfone, polyether sulfone, polyether ketone, polyether ether magnesium, polycarbonate, polyamide, acrylonitrile-butadiene-styrene copolymer or combinations thereof.

According to embodiments of the present disclosure, in order to further improve mechanical strength of the metal shell obtained, in some embodiments, the material used in the plastic-supporting layer includes a mixture of resin and glass fiber. In some other embodiments, the resin of the mixture includes polyethylene glycol terephthalate, polyphenylene sulfide, polycarbonate, polyamide or combinations thereof, and based on the weight of the mixture, the glass fiber has a content of 1 wt % to 50 wt %, in some embodiments of the present disclosure, the glass fiber has a content of 20 wt % to 40 wt %.

In addition, in some embodiments of the present disclosure, the plastic-supporting layer is formed by injection molding the resin or the mixture of resin and glass fiber on the inner surface of the metal substrate.

Besides, in some embodiments, the decorative layer 400 is formed via electrophoresis, micro-arc oxidation, anodic oxidation, hard anodic oxidation, spraying or combinations thereof.

According to embodiments of the present disclosure, there is no particular limitation for thickness of the decorative layer, the thickness of the decorative layer could be conventional thickness in the art. For example, the thickness of the decorative layer could be 5-60 μm.

In summary, the present disclosure provides the metal shell of communication equipment, the metal shell of communication equipment includes the metal substrate, one or more slits penetrating inner and outer surfaces of the metal substrate, the plastic-supporting layer formed on an inner surface of the metal substrate and the decorative layer formed on the outer surface of the metal substrate. The width of the slit on the outer surface of the metal substrate is 15-500 μm, the width of the slit on the inner surface of the metal substrate is 20-600 μm, the ratio of the width of the slit on the inner surface of the metal substrate to the width of the slit on the outer surface of the metal substrate is between 1.05:1 and 1.5:1.

The metal shell of communication equipment according to the present disclosure could be manufactured by following method. The method includes following steps:
1) cutting through the metal substrate via the laser to form the slit penetrating the inner and outer surfaces of the metal substrate,
2) injection molding the resin on the inner surface of the metal substrate,
3) forming the decorative layer on the outer surface of the metal substrate.

According to embodiments of the present disclosure, the thickness of the metal substrate is 0.2-2 mm. Besides, since the metal substrate is thick enough, when the laser cuts through the metal substrate to form the slit, the metal substrate does not deform, and the metal substrate has sufficient strength to carry out subsequent injection molding, mechanical treatment (such as polishing, grinding, sandblasting, etc.) and surface decoration. In some embodiments of the present disclosure, the thickness of the metal substrate is 0.6-1.2 mm.

According to embodiments of the present disclosure, one or more slits are formed in the metal substrate. The slits could effectively ensure the signal transmission between the antenna and the outside world, and achieve communication. In some embodiments of the present disclosure, the metal substrate is cutting through via the laser, then the slit penetrating inner and outer surfaces of the metal substrate is formed.

The width of the slit could be determined, provided that the communication could be achieved. To further improve the communication effect, in some embodiments of the present disclosure, the width of the slit on the outer surface of the metal substrate is 15-500 μm, the width of the slit on the inner surface of the metal substrate is 20-600 μm, and a ratio of the width of the slit on the inner surface of the metal substrate to the width of the slit on the outer surface of the metal substrate is between 1.05:1 and 1.5:1, in some embodiments of the present disclosure, the width of the slit on the outer surface of the metal substrate is 15-200 μm, the width of the slit on the inner surface of the metal substrate is 20-250 μm, and the ratio of the width of the slit on the inner surface of the metal substrate to the width of the slit on the outer surface of the metal substrate is between 1.05:1 and 1.4:1. In some embodiments of the present disclosure, the width of the slit on the outer surface of the metal substrate is 15-200 μm, the width of the slit on the inner surface of the metal substrate is 20-220 μm, and the ratio of the width of the slit on the inner surface of the metal substrate to the width of the slit on the outer surface of the metal substrate is between 1.1:1 and 1.35:1.

Besides, a length of the slit is 0.1-500 mm. In some embodiments of the present disclosure, the length of the slit is 10-150 mm, a distance between two adjacent slits is 0.1-10 mm. In some embodiments of the present disclosure, the distance between two adjacent slits is 0.3-1.6 mm. In addition, there is no particular limitation for amount and shape of the slit, provided that communication could be achieved. For example, the amount of the slit may be 1-200. In some embodiments of the present disclosure, the amount of the slit may be 5-50, and the slit may have a shape of linear, curvilinear, square wave linear or sawtooth linear. In some embodiments of the present disclosure, the slit has a shape of linear.

According to embodiments of the present disclosure, to obtain the slit with the mentioned range, in some embodiments of the present disclosure, laser-cutting conditions include: processing power of 20-500 W, processing speed of 2-50 mm/s, frequency of 0.5-5 kHz. In some embodiments of the present disclosure, the laser-cutting conditions include: processing power of 40-250 W, processing speed of 5-30 mm/s, frequency of 1.2-3 kHz.

In some embodiments of the present disclosure, wavelength of the laser is 1060-1080 nm. In some embodiments of the present disclosure, the wavelength of the laser is 1064 nm or 1080 nm.

According to embodiments of the present disclosure, since a coaxial-blowing is used in the laser-cutting process, metal residue could be discharged from the lower surface of the metal substrate to prevent slit-area from being filled with metal anew.

According to embodiments of the present disclosure, the slit is directly formed in the metal substrate via the laser-cutting, such that the residue is discharged from the lower surface of the metal substrate, and the slit-area is prevented from being filled with metal anew. The slit is obtained by above-mentioned conditions, the upper surface and the lower surface of the slit are basically without the taper, thus slit-width of the upper and lower surfaces does not affect the passage for the electromagnetic waves transmission.

According to embodiments of the present disclosure, the method of the injection molding resin may be carried out by a conventional injection molding method, for example, the injection molding is performed under conditions of: an injection pressure of 1600 bar to 2400 bar, a maintaining pressure of 800 bar to 1400 bar, a temperature of upper and lower mold of 80 Celsius degrees to 150 Celsius degrees, and an injection time of 0.5 seconds to 2 seconds.

The resin used in the injection molding could be any commonly used resin in the art, for example, the resin could be polyethylene, polypropylene, polyacetal, polystyrene, modified polyphenyl ether, polyethylene glycol terephthalate, polybutylene terephthalate, polyethylene naphthalate, polyphenylene sulfide, polyimide, polyamide-imide, polyetherimidem, polysulfone, polyether sulfone, polyether ketone, polyether ether magnesium, polycarbonate, polyamide, acrylonitrile-butadiene-styrene copolymer or combinations thereof.

In order to further improve mechanical strength of the metal shell obtained, in some embodiments, the material used in the injection molding includes the mixture of resin and glass fiber. In some other embodiments, the resin of the mixture includes polyethylene glycol terephthalate, polyphenylene sulfide, polycarbonate or polyamide, and based on the weight of the mixture, the glass fiber has a content of 1 wt % to 50 wt %. In some other embodiments, the glass fiber has a content 20 wt % to 40 wt %.

According to embodiments of the present disclosure, to improve the aesthetic aspect of the metal shell, a decorative layer is formed on the outer face of the metal substrate. The decorative layer could be formed by any common method and under any common conditions, for example, the decorative layer could be formed via electrophoresis, micro-arc oxidation, anodic oxidation, hard anodic oxidation, spraying or combinations thereof.

The thickness of the decorative layer could be varied in a relatively large range, in some embodiments of the present disclosure, the thickness of the decorative layer is 5 microns to 60 microns. The decorative layer could be any common shell decorative layer of currently-available variety of electronic products, for example, the shell decorative layer could be aluminum oxide layer, epoxy coating layer or acrylic resin coating layer.

In some embodiments of the present disclosure, the decorative layer could be formed via anodic oxidation. The conditions of the anodic oxidation could be common conditions known by those skilled in the art, for example, the conditions of anodic oxidation may include: a bath solution of sulfuric acid having a concentration of 150 g/L to 210 g/L, a voltage of 10 V to 15 V, a current density of 1 to 2 A/dm$^2$, a temperature of 10 Celsius degrees to 20 Celsius degrees, an anodic oxidation time of 20 minutes to 60 minutes, a sealing bath solution(for example, NiSO$_4$ aqueous solution) having a concentration of 1 g/L to 10 g/L, a sealing temperature of 50 Celsius degrees to 95 Celsius degrees, and a sealing time of 10 minutes to 50 minutes. The decorative layer formed via the anodic oxidation stated above generally has a thickness of 10 microns to 30 microns.

In some other embodiments of the present disclosure, the decorative layer could be formed via micro-arc oxidation. The conditions of the micro-arc oxidation could be common conditions known by those skilled in the art, for example, the conditions of micro-arc oxidation may include: a pH of 6-12, a voltage of 0 V to 800 V, a current density of 1 A/dm$^2$ to 10 A/dm$^2$, a temperature of 15 Celsius degrees to 60 Celsius degrees, a time of 10 minutes to 60 minutes, a sealing bath solution of water, a sealing temperature of 70 Celsius degrees to 90 Celsius degrees, and a sealing time of 1 minute to 10 minutes. The decorative layer formed via the micro-arc oxidation stated above generally has a thickness of 10 microns to 50 microns.

According to embodiments of the present disclosure, the decorative layer could be formed via electrophoresis. The conditions of the electrophoresis could be common conditions known by those skilled in the art, for example, the conditions of electrophoresis may include: cathode electrophoresis: a voltage of 20 V to 60 V, a pH of 4-6, a temperature of 15 Celsius degrees to 30 Celsius degrees, a time of 20 seconds to 60 seconds; anode electrophoresis: a voltage of 40 V to 100 V, a pH of 6-8, a temperature of 15 Celsius degrees to 30 Celsius degrees, a time of 40 seconds to 90 seconds; a baking temperature of 120 Celsius degrees to 200 Celsius degrees, and a baking time of 30 minutes to 60 minutes. The decorative layer formed via the electrophoresis stated above generally has a thickness of 5 microns to 35 microns.

According to embodiments of the present disclosure, the decorative layer could be formed via spraying. The conditions of the spraying could be common conditions known by those skilled in the art, for example, the conditions of spraying may include: a static high voltage of 60 kV to 90 kV, a static current of 10 µA to 20 µA, a velocity pressure of 0.3 Mpa to 0.55 Mpa, an atomizing pressure of 0.33 Mpa to 0.45 Mpa, a transporting velocity of 4.5 m/min to 5.5 m/min, a curing temperature of 150 Celsius degrees to 220 Celsius degrees, and a curing time of 30 minutes to 180 minutes.

Detailed descriptions of the present disclosure will be given below by referring to examples.

EXAMPLE 1

1) Cutting Through the Metal Substrate Via the Laser to Form the Slit

An aluminum alloy (purchased from DONGGUAN GANGXIANG METAL MATERIAL CO., LTD. 6063, thickness of 0.8 millimeters) is cut to form a metal substrate having a size of 15 millimeters×80 millimeters. A laser cutter (A laser produced by HUAGONG JIGUANG, model of LSF20, wavelength of 1064 nanometers) machines the slit on the metal substrate. A machining-power of the laser is 60 W, a machining-speed of laser is 20 mm/s, a machining frequency is 1.5 kHz, and a machining-time is 6 s. The metal substrate A11 is obtained. For the metal substrate A11 obtained, the width of the slit on the outer surface of the metal substrate is 50 µm, the width of the slit on the inner surface of the metal substrate is 60 µm, the number of the slit is 6, the length of the slit is 10 mm, and the distance between two adjacent slits is 0.6 mm. Besides, there is no clogging in a process of slit machining.

2) Injection Molding

The metal substrate is degreased and washed to remove stains and grease from the surface, and then the metal substrate is dried at 80 Celsius degrees for 20 min, a washed and dried metal substrate A12 is obtained. The metal substrate A12 is placed in a mold, the polyphenylene sulfide is used for injection molding. The injection molding is performed under conditions of: the injection pressure of 1800 bar, the maintaining pressure of 800 bar, the temperature of upper and lower mold of 100 Celsius degrees, and the injection time of 1.5 seconds. The plastic-supporting player is formed, thus, a metal substrate A13 with the plastic-supporting player is obtained.

3) Forming a Surface Decorative Layer Via Anodic Oxidation

The metal substrate A13 is subjected to alkali etching, water washing, acid etching and water washing treatment, then the metal substrate A13 is dipped in an electrolytic bath containing H$_2$SO$_4$ aqueous solution having a concentration of 180 g/L. Taking the metal substrate A13 as an anode and a stainless steel as a cathode, the anodic oxidation is performed under a voltage of 15 V, a current density of 1 A/dm$^2$, and a temperature of 19 Celsius degrees for 40 minutes. Then the metal substrate A14 is taken out and cleaned up via ultrasonic wave to avoid hidden acid in the slit which may influence following dyeing. Then the slit is totally covered by the decorative layer and invisible by naked eyes.

The metal substrate A13 after anodic oxidation is dipped in an acidic dye solution (dyestuff: TAC BLACK-SLH, purchased from OKUNO CHEMICAL INDUSTRIES CO., LTD) to conduct dyeing for 10 minutes. The acidic dye solution has a concentration of 5 g/L, a pH of 5.5, and a temperature of 50 Celsius degrees. Then the metal substrate A13 is taken out and cleaned.

Then the metal substrate A13 is dipped in a sealant (NiSO$_4$ aqueous solution, having a concentration of 10 g/L) for 20 minutes, under a temperature of 95 Celsius degrees.

Then the metal substrate A13 is cleaned via pure water having a temperature of 90 Celsius degrees, and baked under 60 Celsius degrees for 15 minutes. Then the decorative layer obtained has a thickness of 20 microns. Thus a communication equipment metal shell A14, which has a flat surface decorative layer with a thickness of 20 microns, is obtained.

EXAMPLE 2

1) Cutting Through the Metal Substrate Via a Laser to Form the Slit

An aluminum alloy (purchased from DONGGUAN GANGXIANG METAL MATERIAL CO., LTD. 6061, thickness of 0.4 millimeters) is cut to form a metal substrate having a size of 15 millimeters×80 millimeters. A laser cutter (A laser produced by HUAGONG JIGUANG, model of LSF20, wavelength of 1064 nanometers) machines the slit on the metal substrate. A machining-power of the laser is 40 W, a machining-speed of laser is 30 mm/s, a machining frequency is 3 kHz, and a machining-time is 4 s. The metal substrate A21 is obtained. In the metal substrate A21 obtained, the width of the slit on the outer surface of the metal substrate is 15 μm, the width of the slit on the inner surface of the metal substrate is 20 μm, the number of the slit is 6, the length of the slit is 10 mm, and the distance between two adjacent slits is 0.6 mm. Besides, there is no clogging in a process of slit machining.

2) Injection Molding

The metal substrate A23 with the plastic-supporting layer is obtained according to the method of Example 1, step 2).

3) Forming a Surface Decorative Layer Via Micro-arc Oxidation

The metal substrate A44 is subjected to a degreasing treatment, then the metal substrate A23 is dipped in an micro-arc oxidation electrolyte (containing 40 g/L of sodium hexametaphosphate, 8 g/L of sodium silicate, and 12 g/L of ammonium metavanadate). Taking the metal substrate A23 as an anode and a stainless steel as a cathode, the micro-arc oxidation is performed under a voltage of 0 V to 600 V, a current density of 5 A/dm$^2$, and a temperature of 25 Celsius degrees for 40 minutes. Then the metal substrate A23 is taken out and cleaned via pure water. Then the slit is totally covered by the decorative layer, and the surface slit is not detectable by hand touching.

The metal substrate A23 is dipped in a hot pure water having a temperature of 85 Celsius degrees for 5 minutes so as to perform sealing, and then the metal substrate A23 is taken out and blow-dried. Thus a communication equipment metal shell A24, which has a flat surface decorative layer with a thickness of 35 microns, is obtained.

EXAMPLE 3

1) Cutting through the Metal Substrate Via a Laser to form the Slit

An aluminum alloy (purchased from DONGGUAN GANGXIANG METAL MATERIAL CO., LTD. 6061, thickness of 0.4 millimeters) is cut to form a metal substrate having a size of 15 millimeters×80 millimeters. A laser cutter (A laser produced by HUAGONG JIGUANG, model of LSF20, wavelength of 1064 nanometers) machines the slit on the metal substrate. A machining-power of laser is 200 W, a machining-speed of laser is 10 mm/s, a machining frequency is 1.2 kHz, and a machining-time is 12 s. The metal substrate A31 is obtained. In the metal substrate A31 obtained, the width of the slit on the outer surface of the metal substrate is 200 μm, the width of the slit on the inner surface of the metal substrate is 220 μm, the number of the slit is 6, the length of the slit is 10 mm, and the distance between two adjacent slits is 0.6 mm. Besides, there is no clogging in a process of slit machining.

2) Injection Molding

The metal substrate A33 with the plastic-supporting layer is obtained according to the method of Example 1, step 2).

3) Forming a Surface Decorative Layer Via Electrophoresis

The metal substrate A33 is subjected to alkali etching, water washing, acid etching and water washing treatment, then the metal substrate A33 is dipped in an electrophoretic paint (obtained by dissolving an acrylic resin (purchased from SHIMIZU CO., LTD) in a colloidal form in water, the acrylic resin has a content of 7 wt %) as a cathode to perform the electrophoresis for 120 seconds under conditions of: pH of the electrophoretic paint on cathode is 4.5, a temperature of 23 Celsius degrees, and a voltage of 35 V so as to form an electrophoresis coating on surface of the metal substrate A54. Then the metal substrate A54 is washed in water for 120 seconds to remove residual liquid on surface of the electrophoresis coating so as to obtain a metal shell after electrophoretic. Then the slit is totally covered by the electrophoretic coating and invisible by naked eyes. Finally, the metal substrate A33 is placed in an oven having a temperature of 175 Celsius to bake for 50 minutes. Thus a communication equipment metal shell A34, which has a flat surface decorative layer with a thickness of 30 microns, is obtained.

EXAMPLE 4

The procedure of Example 4 is similar to the procedure of Example 1, except that there are some changes in step 1: An aluminum alloy (purchased from DONGGUAN GANGXIANG METAL MATERIAL CO., LTD. 6061, thickness of 2 millimeters) is cut to form a metal substrate having a size of 15 millimeters×80 millimeters. A laser cutter (A laser produced by HUAGONG JIGUANG, model of LSF20, wavelength of 1064 nanometers) machines the slit on the metal substrate. A machining-power of laser is 250 W, a machining-speed of laser is 5 mm/s, a machining frequency is 1.2 kHz, and a machining-time is 6 s. The metal substrate A41 is obtained. In the metal substrate A41 obtained, the width of the slit on the outer surface of the metal substrate is 50 μm, the width of the slit on the inner surface of the metal substrate is 70 μm, the number of the slit is 6, the length of the slit is 10 mm, and the distance between two adjacent slits is 0.6 mm. Thus a communication equipment metal shell A14, which has a flat surface decorative layer and has a thickness of 20 microns, is obtained. Besides, there is no clogging in a process of slit machining.

COMPARATIVE EXAMPLE 1

The procedure of the comparative example 1 is similar to the procedure of Example 1, except that there are some changes in step 1: An aluminum alloy (purchased from DONGGUAN GANGXIANG METAL MATERIAL CO., LTD. 6063, thickness of 0.4 millimeters) is cut to form a metal substrate having a size of 15 millimeters×80 millimeters. A laser cutter (A laser produced by ZHENGYE TECHNOLOGY, model of JG12, wavelength of 355 nanometers) machines the slit on the metal substrate. A machining-power of laser is 1.5 W, a machining-speed of laser is 300 mm/s, a machining frequency is 15 kHz, and a machining-time is 10 min. The metal substrate D11 is obtained. In the metal substrate D11 obtained, the width of the slit on the outer surface of the metal substrate is 15 μm, the width of the slit on the inner surface of the metal substrate is 5 μm, the number of the slit is 6, the length of the slit is 10 mm, and the distance between two adjacent slits is 0.6 mm. Thus a communication equipment metal shell D14 is obtained. Besides, during process of machining the slit, the jamming phenomenon is still obvious after 10 min of machining, the metal substrate has a serious deformation as a result of repeated machining for a long time, and the obtained decorative layer of the metal shell is uneven.

According to examples and comparative example mentioned above, the slit of the communication equipment metal shell according to embodiments of the present disclosure is transparent and is without jamming phenomenon, the electromagnetic signals could transmit through the slit more easily. The obtained decorative layer of the metal shell is flat and non-rugged, and the communication equipment metal shell has an effect of an integrated appearance. In contrast, in the comparative example 1, the jamming phenomenon is still obvious after 10 min of machining, the metal substrate has a serious deformation as a result of repeated machining for a long time, and the obtained decorative layer of the metal shell is uneven. Moreover, the upper surface and the lower surface of the slit have a bigger taper, and the laser could not pass through the slit easily.

Although explanatory examples stated above have been shown and described in detail, it may be appreciated by those skilled in the art that the above examples cannot be construed to limit the present disclosure, various simple modifications could be made within technical spirit and principles of the present disclosure, those simple modifications all fall into the protection scope of the present disclosure.

In addition, it should be noted that, each specific technical feature described in the example stated above, under no contradiction, could be combined via any appropriate manner, in order to avoid unnecessary repetition, various possible combination manners are not illustrated in the present disclosure.

In addition, each different example of the present disclosure could also be combined with each other without departing from spirit and principles of the present disclosure, which should also be deemed as content of present disclosure.

What is claimed is:

1. A metal shell of communication equipment, comprising:
    a metal substrate;
    a slit penetrating an inner and an outer surface of the metal substrate;
    a plastic-supporting layer formed on the inner surface of the metal substrate; and
    a decorative layer formed on the outer surface of the metal substrate;
    wherein a width of the slit on the outer surface of the metal substrate is 15-500 μm, a width of the slit on the inner surface of the metal substrate is 20-600 μm, and a ratio of the second width to the first width is between 1.05:1 and 1.5:1.

2. The metal shell of communication equipment according to claim 1, wherein the slit comprises a plurality of slits.

3. The metal shell of communication equipment according to claim 2, wherein a distance between two adjacent slits is 0.1-10 mm.

4. The metal shell of communication equipment according to claim 1, wherein a length of the slit is 0.1-500 mm.

5. The metal shell of communication equipment according to claim 1, wherein the first width is 15-200 μm, the second width is 20-250 μm, and the ratio of the second width to the first width is between 1.05:1 and 1.4:1.

6. The metal shell of communication equipment according to claim 5, wherein the first width is 15-200 μm, the second width is 20-220 μm, and the ratio of the second width to the first is between 1.1:1 and 1.35:1.

7. The metal shell of communication equipment according to claim 1, wherein a thickness of the metal substrate is 0.2-2 mm.

8. The metal shell of communication equipment according claim 7, wherein the thickness of the metal substrate is 0.6-1.2 mm.

9. The metal shell of communication equipment according to claim 1, wherein a thickness of the plastic-supporting layer is 0.1-2 mm.

10. The metal shell of communication equipment according to claim 1, wherein the plastic-supporting layer is formed by injection molding a resin or a mixture of resin and glass fiber on the inner surface of the metal substrate.

11. The metal shell of communication equipment according to claim 10, wherein the resin is made from at least one of polyethylene, polypropylene, polyacetal, polystyrene, modified polyphenyl ether, phenolic resin, polyethylene glycol terephthalate, polybutylene terephthalate, polyethylene naphthalate, polyphenylene sulfide, polyimide, polyamide-imide, polyetherimidem, polysulfone, polyether sulfone, polyether ketone, polyether ether magnesium, polycarbonate, polyamide, or acrylonitrile-butadiene-styrene copolymer or combinations thereof.

12. The metal shell of communication equipment according to claim 1, wherein the decorative layer is formed via at least one method of electrophoresis, micro-arc oxidation, anodic oxidation, hard anodic oxidation, and spraying.

13. A method for manufacturing a metal shell of communication equipment, comprising:
    forming a slit penetrating an inner and an outer surface of a metal substrate;
    forming a plastic-supporting layer on the inner surface of the metal substrate; and
    forming a decorative layer on the outer surface of the metal substrate,
    wherein a width of the slit on the outer surface of the metal substrate is 15-500 μm, a width of the slit on the inner surface of the metal substrate is 20-600 μm, and a ratio of the second width to the first width is between 1.05:1 and 1.5:1.

14. The method according to claim 13, wherein the slit comprises a plurality of slits.

15. The method according to claim 13, wherein a distance between two adjacent slits is 0.1-10 mm.

16. The method according to claim 13, wherein a length of the slit is 0.1-500 mm.

17. The method according to claim 13, wherein a thickness of the metal substrate is 0.2-2 mm.

18. The method according to claim 13, wherein a thickness of the plastic-supporting layer is 0.1-2 mm.

19. The method according to claim 13, wherein the plastic-supporting layer is formed by injection molding a resin or a mixture of resin and glass fiber on the inner surface of the metal substrate.

20. The method according to claim 13, wherein the decorative layer is formed via at least one method of electrophoresis, micro-arc oxidation, anodic oxidation, hard anodic oxidation, and spraying.

\* \* \* \* \*